(12) United States Patent
Sirivella et al.

(10) Patent No.: US 7,751,165 B2
(45) Date of Patent: Jul. 6, 2010

(54) CENTRALLY CONTROLLED PROTECTION SYSTEMS HAVING REDUCED ENERGY LET-THROUGH MODE

(75) Inventors: Anand S. V. Sirivella, Andhra Pradesh (IN); Thomas Papallo, Farmington, CT (US); Gregory P. Lavoie, Bristol, CT (US); Theodore D. Hill, III, West Hartford, CT (US); Radoslaw Narel, Kensington, CT (US); Marcelo Valdes, Burlington, CT (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 12/005,245

(22) Filed: Dec. 26, 2007

(65) Prior Publication Data

US 2008/0106838 A1      May 8, 2008

Related U.S. Application Data

(63) Continuation of application No. 11/323,932, filed on Dec. 30, 2005, now abandoned, and a continuation of application No. 11/290,008, filed on Nov. 30, 2005.

(51) Int. Cl.
  *H02H 3/00* (2006.01)
(52) U.S. Cl. .......................................... 361/62; 361/64
(58) Field of Classification Search .............. 361/62–69
  See application file for complete search history.

(56) References Cited

U.S. PATENT DOCUMENTS

| | | | |
|---|---|---|---|
| 3,903,807 A | 9/1975 | Lee | 104/131 |
| 4,073,000 A | 2/1978 | Krejsa | 361/344 |
| 4,752,853 A | 6/1988 | Matsko et al. | 361/94 |
| 5,164,875 A | 11/1992 | Haun et al. | 361/64 |
| 5,253,159 A | 10/1993 | Bilas et al. | 364/140 |
| 5,343,192 A | 8/1994 | Yenisey | 340/639 |
| 5,455,760 A | 10/1995 | Bilas et al. | 364/140 |
| 5,475,558 A | 12/1995 | Barjonnet et al. | 361/64 |
| 5,581,433 A | 12/1996 | Jordan | 361/93 |
| 5,596,473 A | 1/1997 | Johnson et al. | 361/97 |
| 5,825,643 A | 10/1998 | Dvorak et al. | 364/140 |
| 5,872,722 A | 2/1999 | Oravetz et al. | 364/528.27 |
| 5,892,449 A | 4/1999 | Reid et al. | 340/639 |
| 5,982,596 A | 11/1999 | Spencer et al. | 361/64 |
| 6,005,757 A | 12/1999 | Shvach et al. | 361/64 |
| 6,005,758 A | 12/1999 | Spencer et al. | 361/64 |
| 6,038,516 A | 3/2000 | Alexander et al. | 702/67 |

(Continued)

FOREIGN PATENT DOCUMENTS

| | | |
|---|---|---|
| EP | 0588529 B1 | 7/1998 |
| EP | 0717426 B1 | 3/1999 |
| EP | 0933859 A1 | 8/1999 |
| EP | 0517888 B1 | 6/2004 |
| EP | 0957556 A3 | 11/2004 |
| EP | 1511147 A2 | 3/2005 |

(Continued)

*Primary Examiner*—Danny Nguyen
(74) *Attorney, Agent, or Firm*—Ohlandt, Greeley, Ruggiero & Perle, L.L.P.

(57) ABSTRACT

A centrally controlled protection system is provided. The system includes a plurality of circuit breakers, a plurality of modules, and a central computer. Each of the plurality of breakers are in electrical communication with a respective one of the plurality of modules. The central computer is in communication with each of the plurality of modules via a network. The central computer controls the plurality of circuit breakers in either a normal mode or a reduced energy let-through mode.

18 Claims, 5 Drawing Sheets

U.S. PATENT DOCUMENTS

| | | | |
|---|---|---|---|
| 6,055,144 A | 4/2000 | Reid | 361/64 |
| 6,127,882 A | 10/2000 | Vargha et al. | 327/538 |
| 6,157,527 A | 12/2000 | Spencer et al. | 361/64 |
| 6,327,130 B1 | 12/2001 | Durif et al. | 361/139 |
| 6,411,865 B1 | 6/2002 | Qin et al. | 700/292 |
| 6,489,577 B2 | 12/2002 | Kurata | 200/331 |
| 6,611,068 B2 | 8/2003 | Cratty | 307/64 |
| 6,734,768 B2 | 5/2004 | Kim | 335/6 |
| 6,744,260 B2 | 6/2004 | Schmalz et al. | 324/555 |
| 6,759,616 B2 | 7/2004 | Rokunohe et al. | 218/2 |
| 6,810,069 B2 | 10/2004 | Kojovic et al. | 373/60 |
| 6,892,115 B2 | 5/2005 | Berkcan et al. | 700/286 |
| 6,967,283 B2 | 11/2005 | Rasmussen et al. | 174/50 |
| 6,992,247 B2 | 1/2006 | Rasmussen et al. | 174/48 |
| 7,122,916 B2 | 10/2006 | Nguyen et al. | 307/57 |
| 7,151,329 B2 | 12/2006 | Andarawis et al. | 307/52 |
| 7,180,717 B2 | 2/2007 | Kojovic et al. | 361/62 |
| 7,203,040 B2 | 4/2007 | Shipp et al. | 361/5 |
| 7,254,001 B2 | 8/2007 | Papallo et al. | 361/64 |
| 7,262,943 B2 | 8/2007 | Stellato et al. | 361/62 |
| 7,324,876 B2 | 1/2008 | Ying | 700/295 |
| 2002/0032535 A1 | 3/2002 | Alexander et al. | 702/64 |
| 2003/0009302 A1 | 1/2003 | Leslie | 702/65 |
| 2004/0231875 A1 | 11/2004 | Rasmussen et al. | 174/50 |
| 2005/0047045 A1 | 3/2005 | Puskar et al. | 361/115 |
| 2005/0240315 A1 | 10/2005 | Booth et al. | 379/106.03 |
| 2007/0121265 A1* | 5/2007 | Hill et al. | 361/62 |

FOREIGN PATENT DOCUMENTS

| | | |
|---|---|---|
| EP | 1385015 A3 | 2/2006 |
| EP | 1583131 B1 | 9/2007 |
| WO | 92/09899 A1 | 6/1992 |
| WO | 92/11676 A1 | 7/1992 |
| WO | 93/12566 A1 | 6/1993 |
| WO | 94/00824 A1 | 1/1994 |
| WO | 02/01324 A3 | 1/2002 |
| WO | 03/030509 A1 | 4/2003 |
| WO | 2004/038881 A3 | 5/2004 |

* cited by examiner

_US 7,751,165 B2_

CENTRALLY CONTROLLED PROTECTION SYSTEMS HAVING REDUCED ENERGY LET-THROUGH MODE

CROSS REFERENCE TO RELATED APPLICATIONS

This application is a continuation of U.S. application Ser. No. 11/323,932 filed Dec. 30, 2005, now abandoned and is a continuation of U.S. application Ser. No. 11/290,008, filed Nov. 30, 2005, the contents of both of which are incorporated by reference thereto.

BACKGROUND OF THE INVENTION

This disclosure relates to centrally controlled protection systems. More particularly, this disclosure relates to centrally controlled protection systems having a reduced energy let-through mode.

In power distribution systems, power is distributed to various loads from one or more feeder circuits. The power is typically divided into branch circuits, which supply power to the specified loads. It is known to provide circuit protective devices, e.g., circuit breakers, to protect the branch and feeder circuits in the event of undesired power conditions in the system.

Circuit breakers typically function automatically to prevent or minimize damage. In some prior systems, the circuit breakers minimize the extent and duration of electrical service interruption.

Recently, it has been proposed by the Assignee of the present application to provide centrally controlled protection systems, where all of the circuit breakers in the system are controlled by a centralized computer.

It has now been determined that there is a need for centrally controlled protection systems having a reduced energy let-through mode.

SUMMARY OF THE INVENTION

A centrally controlled protection system is provided. The system includes a plurality of circuit breakers, a plurality of modules, and a central computer. Each of the plurality of breakers is in electrical communication with a respective one of the plurality of modules. The central computer is in communication with each of the plurality of modules via a network. The central computer controls the plurality of circuit breakers in either a normal mode or a reduced energy let-through mode.

A centrally controlled protection system is provided. The system includes main breakers at a first level of a power distribution system, tie-breakers at a second level of the power distribution system, and feeder breakers at a third level of the power distribution system. The main, tie, and feeder breakers are divided into zones of protection. Each of the main, tie, and feeder breakers is in electrical communication with a respective module. The system also includes a central computer in communication with each of the modules via a network so that the central computer controls the main, tie, and feeder breakers. The central computer includes normal settings groups that based upon a state of the main, tie, and feeder breakers within each respective zone of protection. The central computer also includes a forced settings group. The forced settings group includes at least one parameter adjusted, with respect to parameters of the normal settings groups, to reduce energy let-though the respective zone of protection.

A method of controlling a centrally controlled protection system is provided. The method includes using a central controller to control a plurality of circuit breakers in a first zone of protection by automatically selecting from a plurality of normal settings groups based on a state of the plurality of circuit breakers in the first zone of protection, and forcing the central computer to control the plurality of circuit breakers in the first zone of protection using a forced settings group, the forced settings group having at least one parameter for reducing energy let through the zone of protection as compared to the normal settings groups.

The above-described and other features and advantages of the present disclosure will be appreciated and understood by those skilled in the art from the following detailed description, drawings, and appended claims.

DETAILED DESCRIPTION OF THE INVENTION

Figure 1:
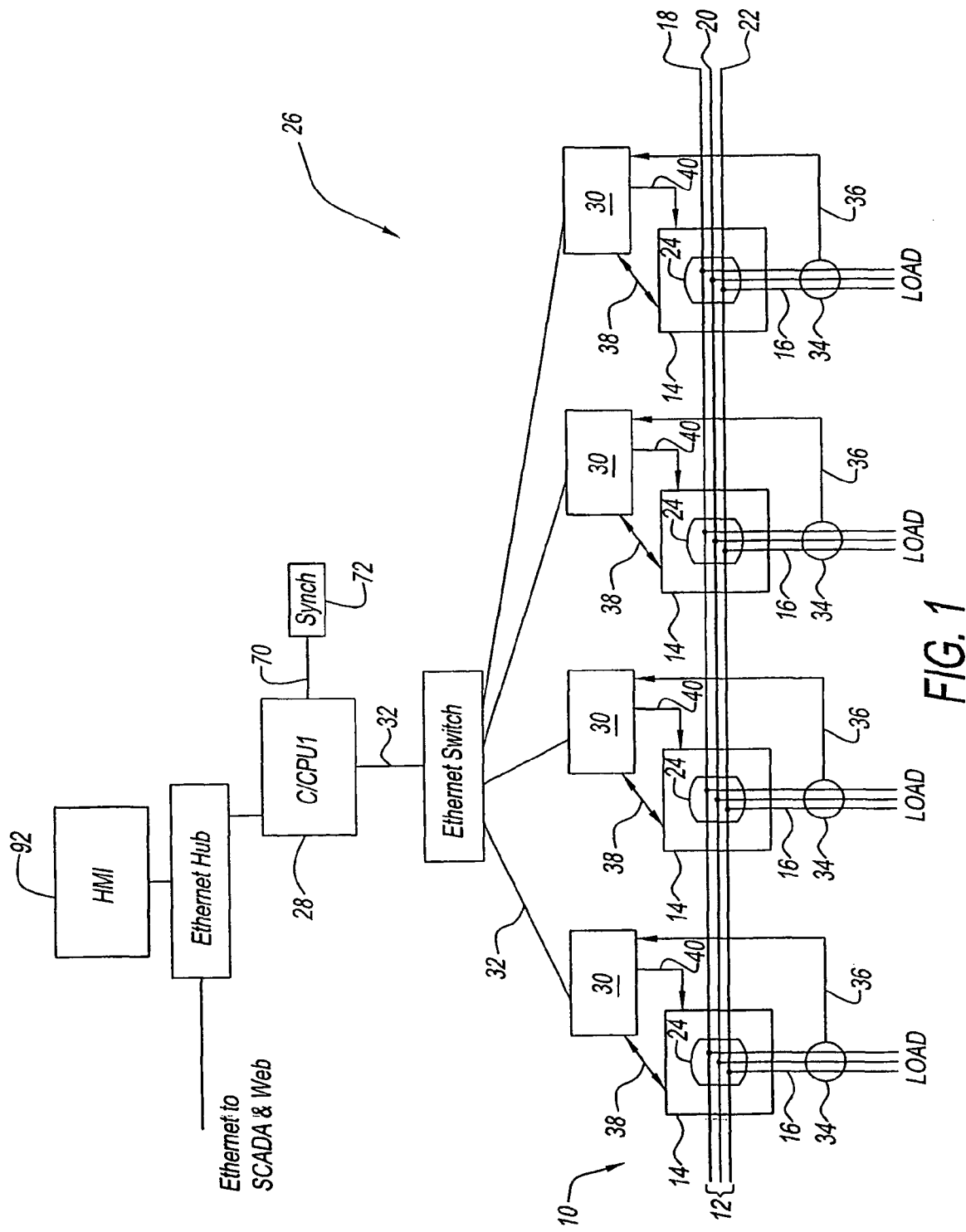
FIG. 1 is a schematic illustration of a centrally controlled protection system.

Referring now to the drawings and in particular to FIG. 1, an exemplary embodiment of a power distribution system generally referred to by reference numeral 10 is illustrated. Power distribution system 10 distributes power from at least one power bus 12 through a number or plurality of power switching devices or circuit breakers 14 to branch circuits 16.

Power bus 12 is illustrated by way of example as a three-phase power system having a first phase 18, a second phase 20, and a third phase 22. Power bus 12 can also include a neutral phase (not shown). Power distribution system 10 is illustrated for purposes of clarity distributing power from power bus 12 to four circuits 16 by four feeder breakers 14. Of course, it is contemplated by the present disclosure for power bus 12 to have any desired number of phases and/or for power distribution system 10 to have any desired number of circuit breakers 14 and any topology of circuit breakers, e.g., in series, or in parallel, or other combinations.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "protection system").

Advantageously, it has been determined by the present disclosure that protection system 26 can include a reduced energy let-through mode, which reduces the amount of energy that is let through portions of the power distribution system 10 as needed. For example, protection system 26 can be placed into the reduced energy let-through mode during activities such as maintenance or when an operator is in close proximity to various components in the power distribution system 10. As will be described in greater detail below, protection system 26, while in the reduced energy let-through mode, can set the time delay between a particular zone function and a backup function to zero. Thus, protection system 26 can trip all of the circuit breakers 14 that can potentially feed a fault within the initial delay. Moreover, the reduced energy let-through mode allows the delay in the each zone function to be changed to 0.024 seconds so that all zone faults can be cleared in 6 cycles, while not compromising out of zone selectivity. Finally, the reduced energy let-through mode allows the current pickup values in the particular zone functions to be reduced to minimize the current of these zone functions. As such, protection system 26, when in the reduced energy let-through mode, can reduce the energy let-through power distribution system 10.

Beginning with the general operation protection system 26, the protection system is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, protection system 26 can include protection and control schemes that consider the value of electrical signals, such as current magnitude and phase, at one or all the circuit breakers 14. Further, protection system 26 integrates the protection, control, and monitoring functions of the individual breakers 14 of power distribution system 10 in a single, centralized control processor (e.g., CCPU 28). Protection system 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 may performs some or all of instantaneous overcurrent protection (IOC), short time overcurrent, longtime overcurrent, relay protection, and logic control as well as digital signal processing functions of protection system 26. Thus, protection system 26 enables settings to be changed and data to be logged in a single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition or electrical parameter of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition or electrical parameter of the incoming power in circuits 16 and provide a first or parameter signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position or state of separable contacts 24, a spring charge switch status, a lockout state or condition, and others. In addition, module 30 is configured to operate or actuate circuit breaker 14 by sending one or more third signals 40 to the breaker to open/close separable contacts 24 as desired, such as open/close commands or signals. In a first embodiment, circuit breakers 14 cannot open separable contacts 24 unless instructed to do so by protection system 26.

Protection system 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, protection system 26 can be configured to provide a consistent fault response time. As used herein, the fault response time of protection system 26 is defined as the time between when a fault condition occurs and the time module 30 issues an trip command to its associated breaker 14. In an exemplary embodiment, protection system 26 has a fault response time that is less than a single cycle of the 60 Hz (hertz) waveform. For example, protection system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for preventing collisions.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, protection system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, protection system 26 provides a coherent and integrated protection, control, and monitoring methodology not considered by prior systems. For example, protection system 26 integrates and coordinates load management, feed management, system monitoring, and other system protection functions in a low cost and easy to install system.

Figure 2:
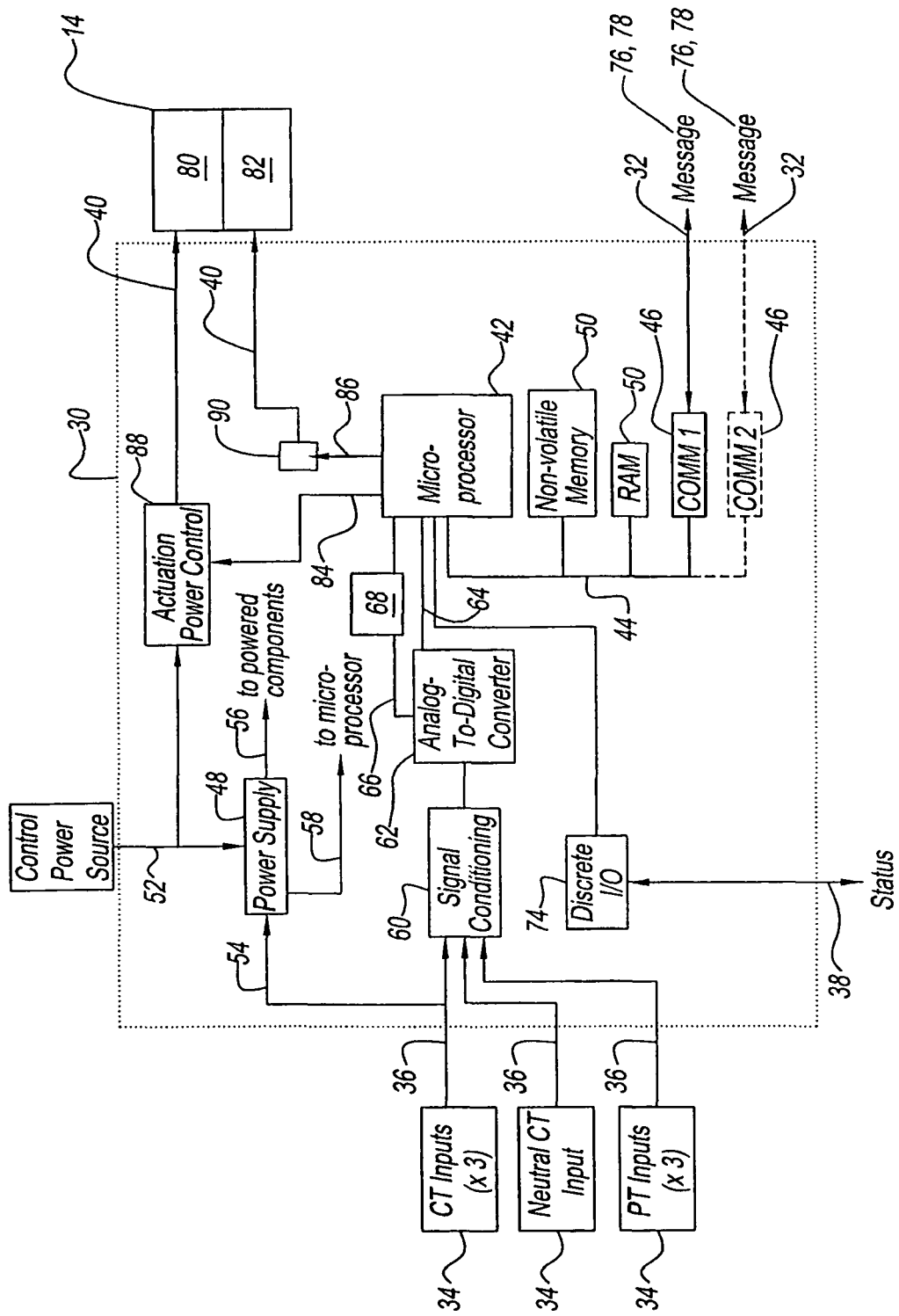
FIG. 2 is a schematic illustration of a module of the protection system of FIG. 1.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, protection system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can include a filtering circuit (not shown) to improve a signal-to-noise ratio for first signal 36, a gain circuit (not shown) to amplify the first signal, a level adjustment circuit (not shown) to shift the first signal to a predetermined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in protection system 26 to be collected at substantially the same time. Specifically, it is desired for digital signals 64 from all of the modules 30 in protection system 26 to be representative of substantially the same time instance of the power in power distribution system 10.

Modules 30 sample digital signals 64 based, at least in part, upon a synchronization signal or instruction 70 as illustrated in FIG. 1. Instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in protection system 26 to ensure that the sampling (i.e., digital signals 64) from all of the modules in the system is synchronized.

Accordingly, protection system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of protection system 26 can be affected by the port-to port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by protection system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32, such as open or close commands or signals, or circuit breaker actuation or de-actuation commands or signals.

In response to second message 78, microprocessor 42 causes third signal 40 to operate or actuate (e.g., open contacts 24) circuit breaker 14. Circuit breaker 14 can include more than one operation or actuation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated when only second source 54 is present. In this manner, microprocessor 42 can operate circuit breaker 14 in response to a specified condition, such as, for example, a detected overcurrent, regardless of the state of first and second sources 52, 54. Additionally, a lockout device can be provided that is operably connected to circuit breaker 14.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, protection system 26 can control each circuit breaker 14 based on the information from that breaker alone, or in combination with the information from one or more of the other breakers in the protection system 26. Under normal operating conditions, protection system 26 performs all monitoring, protection, and control decisions at CCPU 28.

Figure 3:
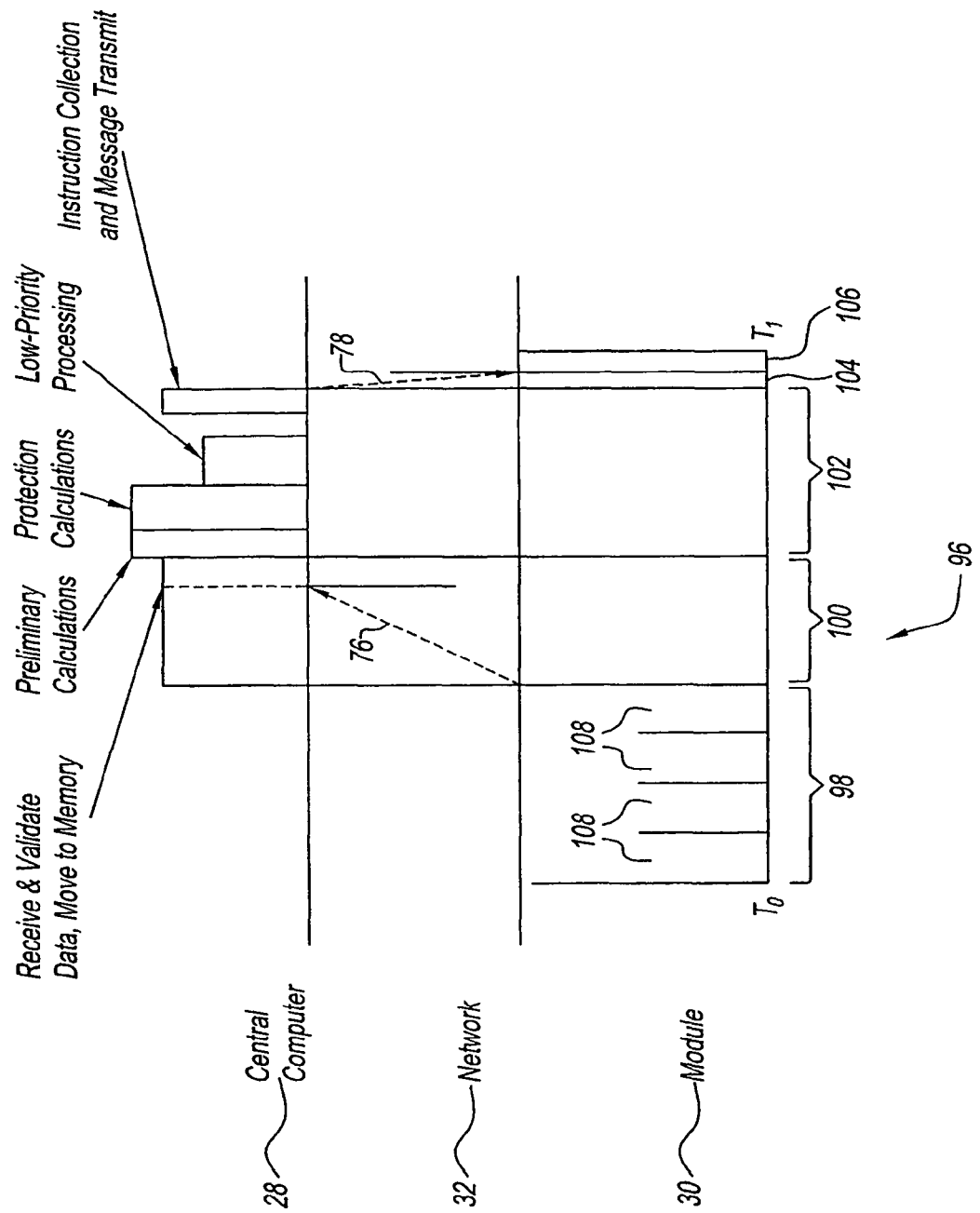
FIG. 3 is a schematic illustration of a response time for the protection system of FIG. 1.

Referring now to FIG. 3, an exemplary embodiment of a response time 96 for protection system 26 is illustrated with the system operating stably (e.g., not functioning in a start-up mode). Response time 96 is shown starting at T0 and ending at T1. Response time 96 is the sum of a sample time 98, a receive/validate time 100, a process time 102, a transmit time 104, and a decode/execute time 106.

In this example, protection system 26 includes twenty-four modules 30 each connected to a different circuit breaker 14. Each module 30 is scheduled by the phase-lock-loop algorithm and synchronization instruction 70 to sample its first signals 36 at a prescribed rate of 128 samples per cycle. Sample time 98 includes four sample intervals 108 of about 0.13 milliseconds (ms) each. Thus, sample time 98 is about 0.27 ms for data sampling and packaging into first message 76.

Receive/validate time 100 is preferably initiated at a fixed time delay after the receipt of synchronization instruction 70. In an exemplary embodiment, receive/validate time 100 is a fixed time that is, for example, the time required to receive all first messages 76 as determined from the latency of data network 32. For example, receive/validate time 100 can be about 0.25 ms where each first message 76 has a size of about 1000 bits, protection system 26 includes twenty-four modules 30 (i.e., 24,000 bits), and network 32 is operating at about 100 Mbps. Accordingly, CCPU 28 manages the communications and moving of first messages 76 to the CCPU during receive/validate time 100.

The protection processes (i.e., process time 102) starts at the end of the fixed receive/validate time 100 regardless of the receipt of first messages 76. If any modules 30 are not sending first messages 76, CCPU 28 flags this error and performs all functions that have valid data. Since protection system 26 is responsible for protection and control of multiple modules 30, CCPU 28 is configured to not stop the entire system due to the loss of data (i.e., first message 76) from a single module 30. In an exemplary embodiment, process time 102 is about 0.52 ms.

CCPU 28 generates second message 78 during process time 102. Second message 78 can be twenty-four second messages (i.e., one per module 30) each having a size of about 64 bits per module. Alternately, it is contemplated by the present disclosure for second message 78 to be a single, multi-cast or broadcast message. In this embodiment, second message 78 includes instructions for each module 30 and has a size of about 1600 bits.

Transmit time 104 is the time necessary to transmit second message 78 across network 32. In the example where network 32 is operating at about 100 Mbps and second message 78 is about 1600 bits, transmit time 104 is about 0.016 ms.

It is also contemplated for second message 78 to include a portion of instruction 70. For example, CCPU 28 can be configured to send second message 78 upon receipt of the next synchronization instruction 70 from clock 72. In this example, the interval between consecutive second messages 76 can be measured by module 30 and the synchronization information in the second message, if any, can be used by the synchronization algorithm resident on microprocessor 42.

Once modules 30 receive second message 78, each module decodes the message and executes its instructions (i.e., send third signals 40), if any, in decode/execute time 106. For example, decode/execute time 106 can be about 0.05 ms.

In this example, response time 96 is about 1.11 ms. Of course, it should be recognized that system response time 96 can be accelerated or decelerated based upon the needs of protection system 26. For example, system response time 96 can be adjusted by changing one or more of the sample period, the number of samples per transmission, the number of modules 30, the message size, the message frequency, the message content, and/or the network speed.

It is contemplated by the present disclosure for protection system 26 to have response time 96 of up to about 3 milliseconds. Thus, protection system 26 is configured to open any of its circuit breakers within about 3 milliseconds from the time sensors 34 sense conditions outside of the set parameters.

Figure 4:
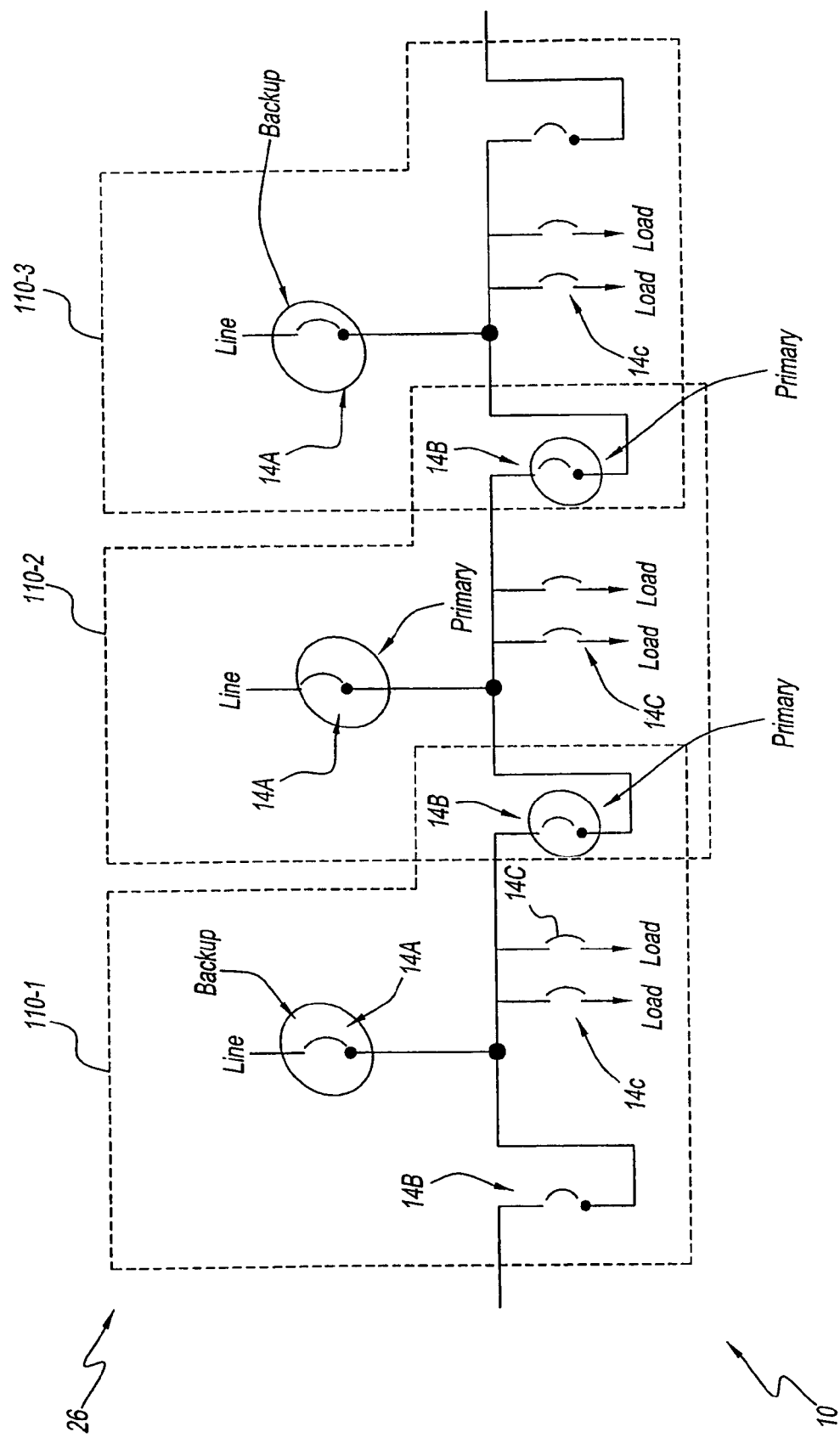
FIG. 4 illustrates an exemplary embodiment of a reduced energy let-through mode of the present disclosure.

As discussed briefly above, it has been determined by the present application that protection system 26 can include both a normal mode 130 and reduced energy let-through mode 140. These operational modes 130, 140 of protection system 26 are described with reference to FIG. 4, in which power distribution system 10 is illustrated having multiple tiers or levels. Specifically, power distribution system 10 includes main breakers 14-a at a first level, tie-breakers 14b at a second level, and feeder breakers 14c at a third level. For purposes of clarity, certain components of power distribution and protection systems 10, 26 have been omitted in FIG. 4.

Protection system 26 can be divided into a plurality of zones of protection 110. In the embodiment illustrated, protection system 26 is illustrated having three zones of protection 110, namely a first zone 110-1, a second zone 110-2, and a third zone 110-3. Each of the zones 110 includes one main breaker 14a, two tie-breakers 14b, and two feeder breakers 14c, where each tie breaker 14b is protected by multiple adjacent zones. Since each zone includes two tie-breakers 14b, one on the left of the zone and one on the right, the tie-breaker 14b on the left of each zone acts as a backup breaker to the zone 110-2.

Of course, it is contemplated by the present disclosure for protection system 26 to have any number of protection zones 110. In addition, it is contemplated by the present disclosure for the protection zones 110 in protection system 26 to have any number of breakers 14a, 14b, 14c.

The state (i.e., open or closed) of circuit breakers 14a, 14b, 14c at a given time define the topology of zone 110 at that time. Thus, each zone 110 of protection system 26 includes a unique settings group 112 for each of the possible topologies or states.

Figure 5:
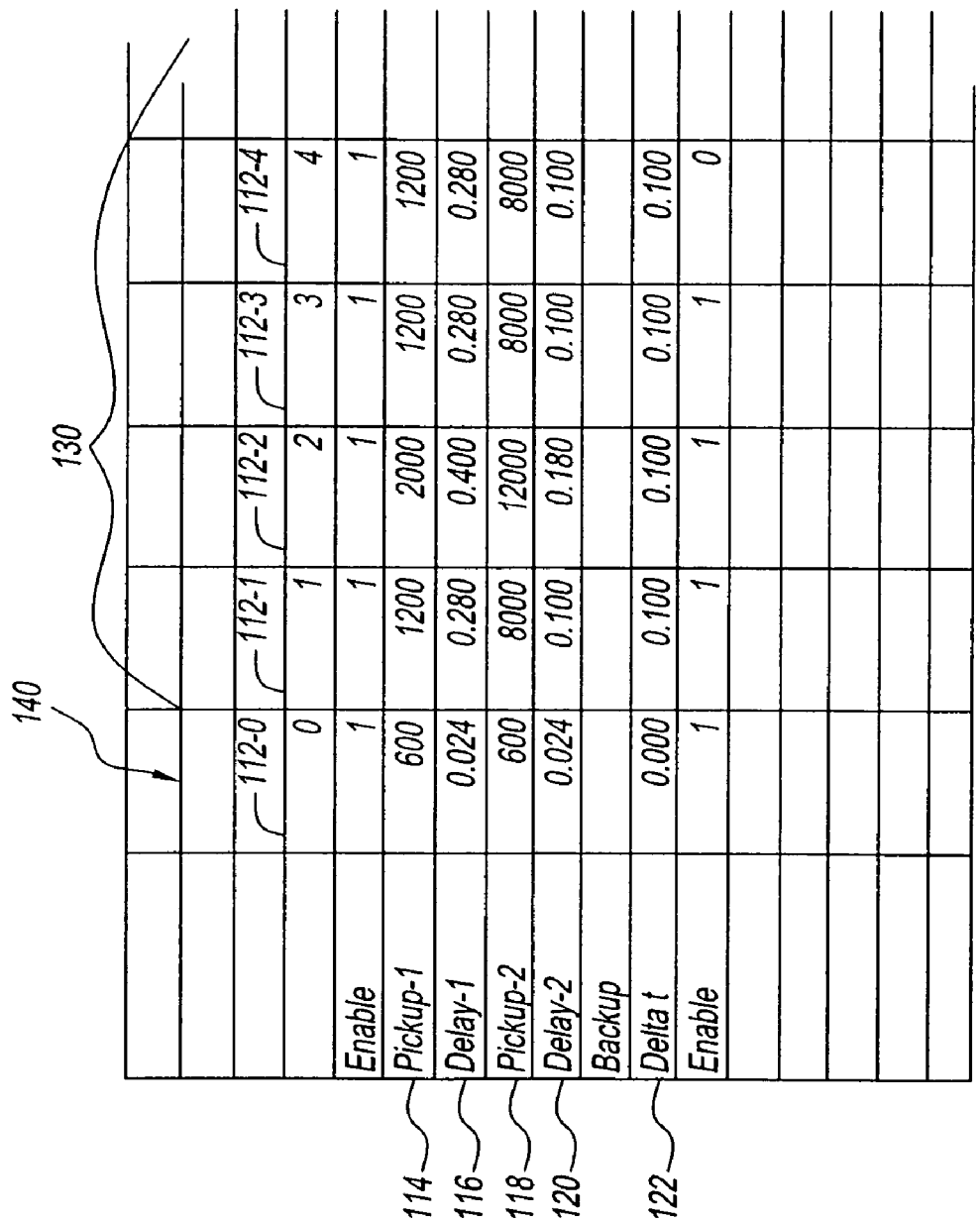
FIG. 5 illustrates an exemplary embodiment of a settings group for the reduced energy let-through mode of FIG. 4.

Referring to FIG. 5, five of the possible settings groups 112 for any of the zones 110-1, 110-2, 110-3 within protection system 10 are shown. Each settings group 112 includes two primary pickup currents 114, 118, two primary time delays 116, 120, and one back-up Delta T 122. This allows setting a longer delay for lower energy events to minimize nuisance operations and a short delay to limit the "on time" of high energy events. The backup function will trip the defined backup breakers in the event the fault current does not go to zero within the specified delta time 122. The backup function does not require additional breakers to be in pickup or time delays other than the delta time 122. In the illustrated settings groups 112, the pickup currents 114, 118 are in amperes, while the times 116, 120, and 122 are in seconds.

In the normal mode 130, protection system 26 automatically switches between normal settings groups 112-1, 112-2, 112-3 and 112-4 based upon the state of circuit breakers 14 in power distribution system 10. Protection system 26 attempts to clear a fault condition in each zone 110 with the nearest breaker 14 upstream of the fault condition using the primary parameters 114, 116, 118, 120. For example, assuming a fault occurs on the bus of zone 110-2 or the feeder breaker compartment 14c of the second zone 110-2, protection system 26 detects the fault in zone 110-2 using either set of primary parameters 114, 116, 118, 120 within the appropriate normal settings groups 112-1 through 112-4. Protection system 26 temporarily, via delta time 122, restrains operation of backup main breakers 14a and/or tie-breaker 14b to provide the primary main breakers 14a and tie breakers 14b sufficient time to clear the fault condition.

In this manner, protection system 26 can control the protection within each zone 110, while maintaining power available in as much of power distribution system 10 as possible.

Advantageously, any one zone 110 or, preferably, all zones 110-1 through 110-3 within protection system 26 can be forced to reduced energy mode 140, which forces that zone to use a forced settings group 112-0. For example, an operator can manually force any zone 110 to reduced energy mode 140 via a human-machine interface 92 in communication with CCPU 28 as shown in FIG. 1. In another example, zones 110 in protection system 26 can be forced to reduced energy mode 140 via an action of the operator such as, but not limited to, opening a panel that houses one or more breakers 14 in that zone.

Forcing a zone 110 to forced settings group 112-0 blocks protection system 26 from automatically switching among normal settings groups 112-1 through 112-4. Rather, protection system 26 controls that zone 110 with forced settings group 112-0 until the operator forces that zone back to normal settings groups 112-1 through 112-4.

Thus, protection system 26 automatically operates in normal mode 130 using normal settings groups 112-1 through 112-4, but is forced by an operator to function in reduced energy let-through mode 140 using force settings group 112-0.

The parameters in forced settings group 112-0 are adjusted to reduce the energy let-though that particular zone 110 as compared the parameters in normal settings groups 112-1 through 112-4. For example, forced settings group 112-0 can have a lower value for first pickup current 114, first time delay 116, second pickup current 118, second time delay 120, time delta 122, or any combinations thereof. —In some embodiments, the parameters in forced settings group 112-0 can also enable/disable any function and the backup function within protection system 26.

As seen in the embodiment illustrated in FIG. 5, the parameters in forced settings group 112-0 have been optimized to minimize the energy let through. Specifically, forced settings group 112-0 includes parameters that have been reduced to lower values for maximum protection. Thus, forced settings group 112-0 has primary pickup currents 114, 118 of about 600 amperes, primary time delays 116, 120 of about 0.024 milliseconds, and time delta 122 of zero seconds. Setting the delta time 122 to zero allows protection system 26 to trip all of the circuit breakers 14a, 14b, 14c that can potentially feed the fault condition after only clearing delays 116, 120. Setting time delays 116, 120 to 0.024 milliseconds allows fault conditions to be cleared in 6 cycles. Finally, setting pickup currents 114, 118 to reduced values minimizes the energy at which the fault condition is picked up and, thus, cleared.

It has been determined by the present disclosure that setting primary time delays 116, 120 to zero is particularly advantages for tie breakers 14b. If a defective tie-breaker with a shorted line or load side is "racked in", namely installed into the system, the defective tie-breaker will cause an arcing fault on the primary connection on that side of the breaker. Because of the close proximity of the line and load sides of the breaker, this will typically cause the opposite bus to fault within several milliseconds. The backup function opens the backup main and tie-breakers immediately when the time delay 116 or 120 is reached. There is no additional delay introduced for fault initiation, additional pickup currents being reached or additional time delays. Thus, tie breaker 14b can be disconnected from all potential sources in a single step.

Since each zone 110 can be separately forced into reduced energy mode 140, the remaining zones can remain in normal mode 130. Thus, operation of any zone 110 of protection system 26 in reduced energy mode 140 does not compromise selectivity in the remaining zones. Because reduced energy can be applied to zone functions, it does not cause a reduction in selectivity for feeder load service or feeder fault conditions.

It should be recognized that operational modes 130, 140 of protection system 26 are described herein by way of example only in use with a tiered power distribution system 10 having a plurality of protection zones. However, it is also contemplated by the present disclosure for protection system 26 having reduced energy let-through 140 to find equal use with non-tiered configurations of power distribution system 10. Thus, it is contemplated by the present disclosure for reduced energy let-through 140 to find use not only in zone protection, but also in single breaker protection functions. Moreover, it is contemplated by the present disclosure for reduced energy let-through 140 to find use with protection system 26 having dynamic zone selective interlocking.

It should also be noted that the terms "first", "second", "third", "upper", "lower", and the like may be used herein to modify various elements. These modifiers do not imply a spatial, sequential, or hierarchical order to the modified elements unless specifically stated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

The invention claimed is:

1. A centrally controlled protection system, comprising:
a plurality of circuit breakers;
a plurality of modules, each of said plurality of breakers being in electrical communication with a respective one of said plurality of modules; and
a central computer in communication with each of said plurality of modules via a network, said central computer normally controlling said plurality of circuit breakers in a normal mode or and selectively controlling said plurality of circuit breakers in a reduced energy let-through mode based upon an operator input to said central computer.

2. The centrally controlled protection system as in claim 1, wherein said central computer performs all primary power distribution functions in said normal mode and said reduced energy let-through mode.

3. The centrally controlled protection system as in claim 2, wherein said primary power distribution functions comprises functions selected from the group consisting of instantaneous overcurrent protection, short time overcurrent, longtime overcurrent, relay protection, logic control, and any combinations thereof.

4. The centrally controlled protection system as in claim 1, wherein said central computer operates in said normal mode until forced to said reduced energy let-through mode by the operator.

5. The centrally controlled protection system as in claim 1, wherein said reduced energy let-through mode comprises at least one parameter that lets reduced energy through said plurality of breakers as compared to said normal mode.

6. The centrally controlled protection system as in claim 5, wherein said at least one parameter is selected from the group consisting of primary pickup currents, primary time delays, a time delta, and any combinations thereof.

7. The centrally controlled protection system as in claim 1, wherein said plurality of circuit breakers are arranged in a tiered power distribution system or a non-tiered power distribution system.

8. The centrally controlled protection system as in claim 1, wherein said plurality of circuit breakers are arranged in a plurality of protection zones.

9. A centrally controlled protection system, comprising:
a plurality of main breakers at a first level of a power distribution system;
a plurality of tie-breakers at a second level of the power distribution system;
a plurality of feeder breakers at a third level of the power distribution system, said plurality of main, tie, and feeder breakers being divided into a plurality of zones of protection;
a plurality of modules, each of said plurality of main, tie, and feeder breakers being in electrical communication with a respective one of said plurality of modules;
a central computer in communication with each of said plurality of modules via a network so that said central computer controls said plurality of main, tie, and feeder breakers;
a plurality of normal settings groups resident in said central computer based upon a state of said main, tie, and feeder breakers within each respective zone of protection; and
a forced settings group resident in said central computer, said forced settings group comprising at least one parameter adjusted, with respect to parameters of said plurality of normal settings groups, to reduce energy let-though said respective zone of protection.

10. The centrally controlled protection system as in claim 9, wherein said at least one parameter in said forced settings group comprises a parameter selected from the group consisting a first pickup current, a first time delay, a second pickup current, a second time delay, a time delta and any combinations thereof.

11. The centrally controlled protection system as in claim 9, wherein said central computer performs all primary power distribution functions for said plurality of main, tie, and feeder breakers.

12. The centrally controlled protection system as in claim 11, wherein said primary power distribution functions comprises functions selected from the group consisting of instantaneous overcurrent protection, short time overcurrent, long-time overcurrent, relay protection, logic control, and any combinations thereof.

13. The centrally controlled protection system as in claim 11, wherein said central computer performs said primary power distribution functions for said plurality of main, tie, and feeder breakers based on said plurality of normal settings groups until forced to use said forced of settings group by an operator.

14. The centrally controlled protection system as in claim 9, wherein said central computer operates in a normal mode using said plurality of normal settings groups and in a reduced energy let-through mode using said forced settings group.

15. A method of controlling a centrally controlled protection system, comprising:
using a central controller to control a plurality of circuit breakers by automatically selecting from a plurality of normal settings groups based on a state of said plurality of circuit breakers; and
forcing, by an operator, said central computer to control at least one of said plurality of circuit breakers using a forced settings group, said forced settings group having at least one parameter for reducing energy let as compared to said normal settings groups.

16. A method of controlling a centrally controlled protection system, comprising:
  using a central controller to control a plurality of circuit breakers in a first zone of protection by automatically selecting from a plurality of normal settings groups based on a state of said plurality of circuit breakers in said first zone of protection; and
  forcing, by an operator, said central computer to control said plurality of circuit breakers in said first zone of protection using a forced settings group, said forced settings group having at least one parameter for reducing energy let through said zone of protection as compared to said normal settings groups.

17. The method as in claim 16, wherein said at least one parameter comprises a parameter selected from the group consisting a first pickup current, a first time delay, a second pickup current, a second time delay, a time delta and any combinations thereof.

18. The method as in claim 16, wherein forcing said central computer to control said plurality of circuit breakers in said first zone of protection using said forced settings group comprises:
  selecting a reduced energy let-through mode for said first zone of protection from an interface in communication with said central computer.

\* \* \* \* \*